Aug. 30, 1932.                H. EGLI ET AL                  1,874,473
                       HAY CURING AND DRYING MACHINE
                          Filed Aug. 3, 1928        5 Sheets-Sheet 2
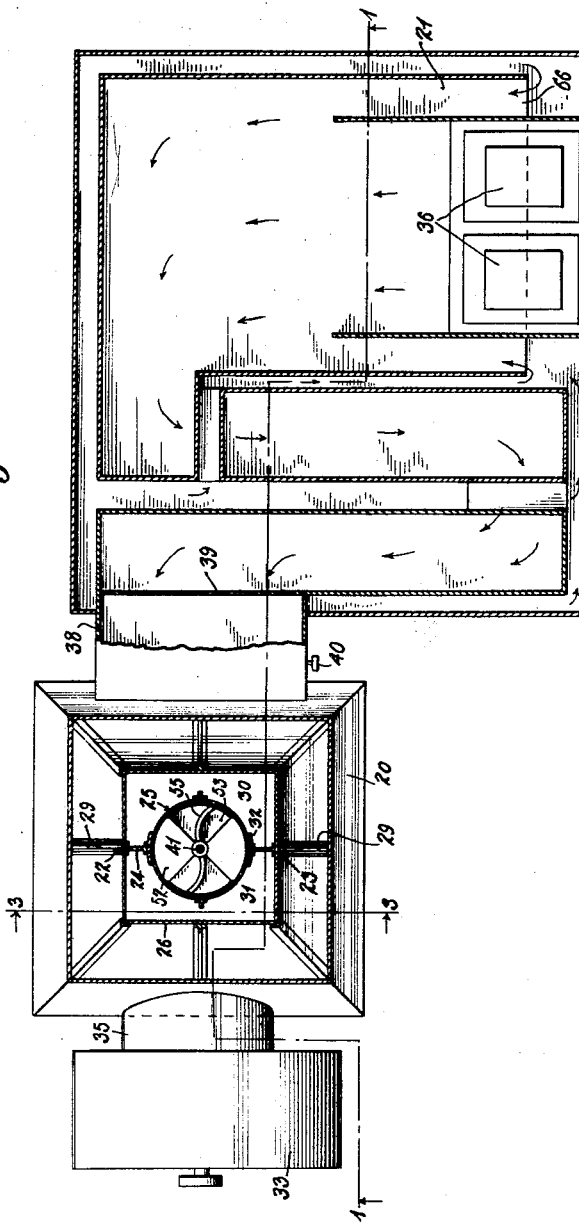
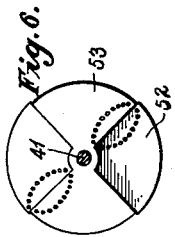
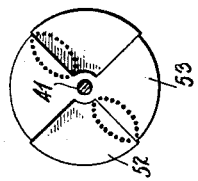
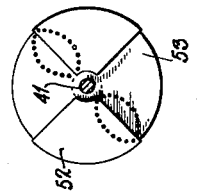
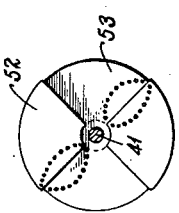
INVENTORS
Huldreich Egli
Samuel M. Shoemaker
BY
ATTORNEYS

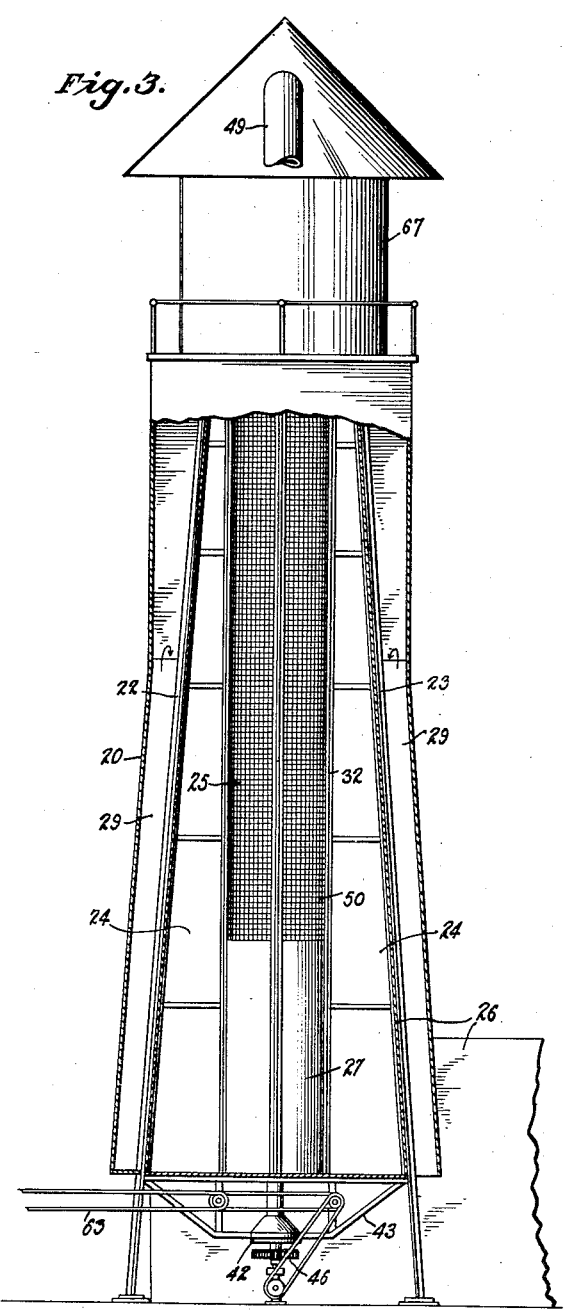
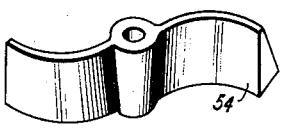
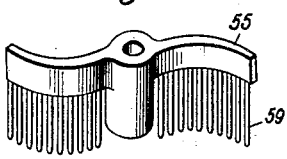
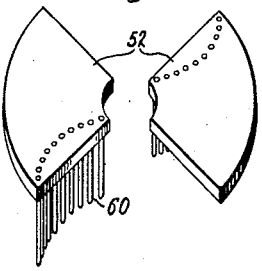
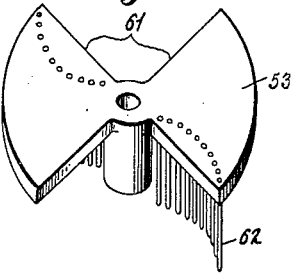

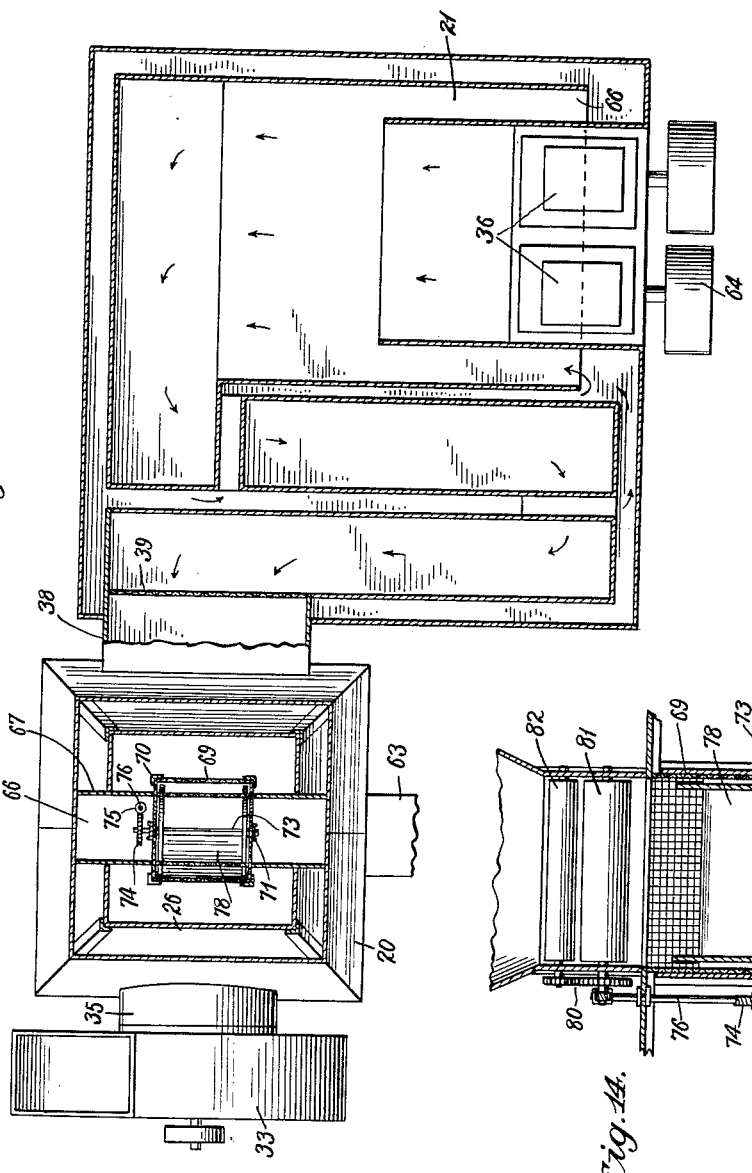

Patented Aug. 30, 1932

1,874,473

UNITED STATES PATENT OFFICE

HULDREICH EGLI, OF BALTIMORE, AND SAMUEL M. SHOEMAKER, OF ECCLESTON, MARYLAND

HAY CURING AND DRYING MACHINE

Application filed August 3, 1928. Serial No. 297,175.

Our invention relates to the art of drying, and has special reference to the curing of succulent forage crops such as cow peas, soy beans, teosinte, Sudan grass, mammoth clover, alfalfa, and the like.

It is well known that the extraction of moisture from forage crops, known technically as "curing", whereby the crop material is reduced to a low moisture content and uniform condition of dryness, is difficult even in fair weather because of the tendency of crops with a naturally high moisture content to pack so that evaporation is arrested, with resultant molding and decay.

Having the foregoing facts in mind we have invented the dryer herein described and claimed in which the forage material is continuously agitated in a positive circulation of heated air, or products of combustion, or a mixture of the two, with the result that the material liberates moisture in the form of vapor which is carried off in the circulating heated current.

The material thus freed of its moisture is dropped onto a suitable conveyor and delivered at any desired place.

In actual practice the material to be dried is passed through a feed cutter and delivered to the top of the drying apparatus by the usual carrier, and is positively fed downward step by step within a foraminous shell located with a closed casing while heated air is drawn through it by means of an exhaust fan.

It is one of the objects of our invention to provide an apparatus that will insure the automatic delivery of a product uniform in moisture content regardless of its initial condition of saturation.

It is also one of the objects of this invention to provide such control that the product is delivered uniform in quality regardless of whether the apparatus operates at full or part capacity.

It is also an object of this invention to utilize the heat of the exhausted gases to preheat the fresh intake air.

The apparatus by which these objects are attained is illustrated in the accompanying drawings in which:

Fig. 2 is a horizontal sectional view taken on line 2—2 of Fig. 1;

Fig. 3 is a vertical section of the drying tower taken substantially on line 3—3 of Fig. 2;

Figure 1:
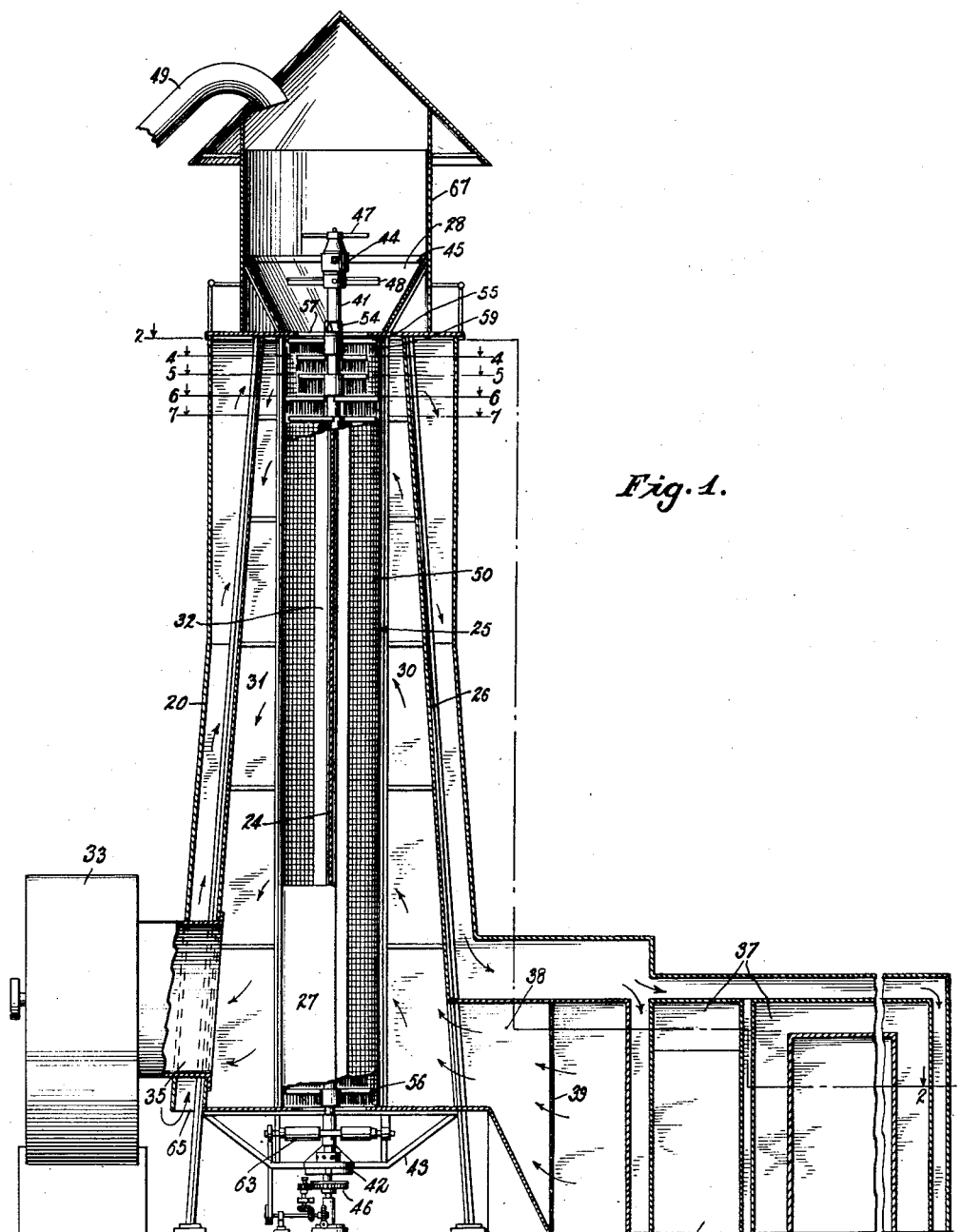
Fig. 1 is a vertical sectional view taken substantially on line 1—1 of Fig. 2.

Figs. 4, 5, 6, and 7 are sectional details taken on lines 4—4, 5—5, 6—6, and 7—7, respectively, of Fig. 1, showing the relative positions of certain of the means of positively advancing the material through the dryer;

Fig. 8 is a perspective view of the feeder arm;

Fig. 9 is a perspective of the starter arm;

Fig. 10 is a perspective view of a pair of receiver plates shown in their proper relation to each other;

Fig. 11 is a perspective view of one of the rotary receiving plates.

Figure 12:
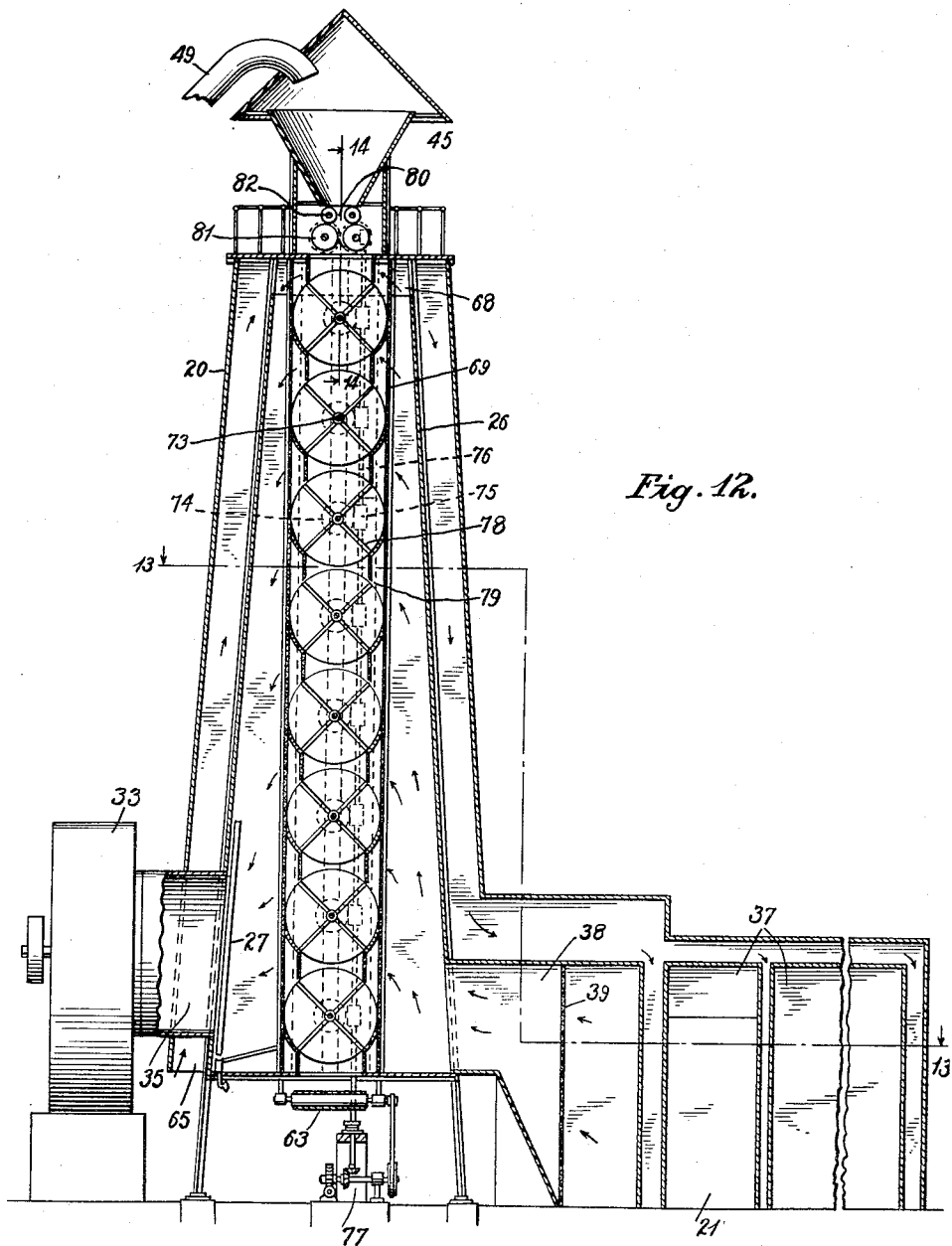

Fig. 12 is a sectional view of a modified form of dryer;

Fig. 13 is a horizontal sectional view taken on line 13—13 of Fig. 12;

Fig. 14 is a detail sectional view taken on line 14—14 of Fig. 12.

In the drawings, in which like numerals always indicate the same parts, 20 is the outer shell of the drying tower and heat exchanger, 21 the heater enclosure therefor. The tower 20 comprises suitable standards 22 and 23 on which are carried the heat exchanger partition plates 24, the conveyor enclosure screen 25, the heat exchanger shell 26, exit baffle plate 27, and the green material hopper 28. It will be noted that the heat exchanger shell 26 extends over and surrounds heater enclosure 21. The two standards 22 and 23 support two partition plates 29 which extend outwardly from the heat exchanger shell 26 for approximately two thirds the height of the standards 22 and 23, as shown in Fig. 3. Plates 24 divide the tower into two chambers 30 and 31 which we term the drying chamber and exit chamber, respectively. In order to prevent stray air currents developing and to insure that all the heater air shall pass through the material to be dried, suitable baffle or damper plates 32 are secured to plates 24. Also to insure thorough circulation of the drying air and to prevent it being drawn directly into the exhaust fan (not shown), located in the fan housing 33, we provide baffle plate 27 extending around the conveyor enclosing screen 25 between plates 24. Fan housing 33 is connected with exit chamber 31 by a suitable exhaust connection 35.

Heat exchanger shell 26 extends over heater enclosure 21 and heat diffusing chambers 37, 36 being the heaters. If desired, products of combustion may be mixed in the heat diffusing chambers 37 with the preheated air passing over the heat exchanger shell 26, hence over the heater enclosure 21, and the heated gases are drawn into the drying chamber by means of the duct 38 in which is located the fire guard screen 39 to prevent sparks coming into contact with the dried material.

Located in duct 38 is a thermostatic control device 40. The structure of this thermostat not being part of this invention, it is shown only diagrammatically. The function of said thermostatic control is to maintain uniform that predetermined degree of heat best suited to the desiccation without internal change of the particular material being dried.

Mounted centrally of the drying tower is the drive shaft 41 supported by a suitable thrust bearing 42 mounted on cradle 43 secured to the lower part of the drying tower. The drive shaft at its top rotates in a bearing 44 carried by brace 45. Drive shaft 41 is propelled by gearing 46 which derives its power from a source not shown. Shaft 41 extends upward into hopper housing 67 and has mounted at its upper end the agitators 47 and 48 which serve to prevent packing of the green material to be dried, which is delivered to the hopper by carrier 49.

The drying conveyor comprises a foraminous shell 50, centrally located in which is the drive shaft 41, a series of stationary segmental plates 52, a series of rotary segmental plates 53 mounted between stationary plates 52 except the first two and last two of the series, a feeder arm 54, a starter arm 55 and a delivery arm 56.

Feeder arm 54 is secured to drive shaft 41 and rotates immediately above the first stationary segmental plate 52, and if desired may have a shearing action with the edges of openings 57 in said plate 52. It will be noted from an inspection of Fig. 2 that these openings occupy approximately one-half the surface area of plate 52. Secured to shaft 41 and rotating therewith between the first two segmental plates 52 is the starter arm 55 provided with advancing fingers or teeth 59.

Beginning with the second segmental plate 52 from the top, each stationary plate 52 is provided on its under side with arresting fingers or teeth 60 for a purpose which will appear later. Rotary plates 53, which are fixed to shaft 41 for rotation therewith, are provided with segmental cut outs 61 occupying one-half the surface area of the plates as shown in Fig. 5 (in practice these openings may be less than one-half). To the under side of plates 53 are secured advancing fingers or teeth 62 whose function will appear later. Between the bottom two fixed or stationary plates 52 is located the delivery arm 56 mounted on shaft 41 for rotation therewith for a purpose presently to appear. 63 is a horizontal conveyor, driven from the gear assembly 46 in any suitable manner. Fuel controlling apparatus 64, controlled by thermostat 40, insures a uniform temperature, the degree of which is determined by the nature of the material to be dried and the speed with which the drive shaft 41 is rotated.

The operation of our drying apparatus is as follows: The exhaust fan is set in motion until proper drying temperature has been established in the drying chamber. This exhausts the heated air from heat exchanger chamber with the result that fresh air is drawn in at 65. This fresh air passes over the tops of the partition plates 29 thence down over the heat diffusing chambers and heater enclosure casings into the heat diffusing chambers at 66, through the guard screen 39, into the drying chamber.

As soon as the proper temperature is established in the drying chamber, shaft 41 is set in motion and the material to be dried is delivered to hopper 28 through carrier 49. Rotation of the agitators 47 and 48 insures freedom from packing of the green material.

The green material falls upon the first plate 52, some falling directly through the openings 57, feeder arm 54 moves over the plate 52 and causes the green material to fall to the second plate 52. Starter arm 55 with its advancing fingers sweeps the material over openings 57 in the second plate 52, through which it falls to the rotating plate 53. The arresting fingers 60 hold the material against rotation with the rotating plate 53 until it is over the openings 61 in said plate 53, whereupon it falls therethrough to the third stationary plate 52. The advancing fingers 62 mounted on the under side of the rotary plates 53, in turn sweep the green material through the segmental openings of said third stationary plate. This step by step advancing of the material is continued until the last or bottom stationary plate is reached, whereupon the delivery arm will cause it to fall through the last two openings 56 onto conveyor 63 which delivers the dried material to any predetermined desired point.

In that form of our dryer shown in Figs. 12 to 14, the general structural elements are the same as shown in the form illustrated in Figs. 1 to 3, and like parts are therefore given the same reference characters. That is, 20 is the outer shell of the drying tower and heat exchanger, and 21 the heater enclosure therefor. Inside the tower shell 20 and symmetrically spaced therefrom is the shell 26 of the heat exchanger, partly supported by the spaced baffle structure 66 composed of plates 67 and outer shell 20, and having ducts 68 at its top. Centrally located of said spaced baffle plates is the rectangular foraminous enclosure screen 69, the panels of which are secured to corner angle-irons 70. Channel-irons 71 stiffen the side panels and carry suitable bearings 72 in which are journalled horizontally disposed shafts 73 having mounted thereon at one end worm gears 74 in mesh with drive pinions 75 secured to vertical drive-shaft 76, actuated by the motor assembly indicated generally by reference numeral 77. Also rigidly mounted on shafts 73 are quadrant plates 78 disposed at right angles to each other, the length and combined width of two of said plates being substantially the same as the side dimension of enclosure screen 69, so that when horizontally disposed any two quadrant plates lying in the same plane will form a diaphragm closing the screen 69. Plates 67 are provided with openings 79 through which plates 78 pass as they are rotated.

Driven by shaft 76 is a feeding mechanism 80 composed of suitable rollers 81 and 82. As in that form of our device illustrated in Fig. 1, the dried material is removed from the plant by a suitable conveyor 63.

The mode of operation of this modified form of our dryer is as follows: The material to be dried is delivered from a suitable cutting mechanism, not shown, through conveyor 49 and delivered to feed rolls 82 and 81. From these it is fed to the first, or top quadrant which, in rotating, dumps it onto the next succeeding quadrant, and so on until the material is delivered to discharge conveyor 63. As the raw material is fed from quadrant to quadrant, hot gases from the heat diffusing chambers 37 and 38 are drawn through the said material by exhaust fan 33.

It will be noted that the incoming air passes along the partition of the drying chamber, thereby being preheated and thus utilizing otherwise waste heat and effecting a corresponding saving in the amount of fuel necessary to operate our dryer at peak efficiency.

For example, it is within the purview of our invention to substitute for step by step feeding mechanism shown, a vertical series of horizontally disposed rotary quadrants, driven by suitable means, such as a series of worm gears located on a vertical shaft. In this form of our machine the foraminous shell is square in cross section.

Having thus fully described our dryer and its manner of operation, what we claim as novel and desire to secure by Letters Patent is:

We claim:

1. In a dryer the combination of a vertical drying chamber, a step by step conveyor for advancing forage material intermittently therethrough by gravity, a heating chamber, a duct connecting said chambers, a preheating chamber surrounding said drying chamber, and means for causing the passage of air through all said chambers.

2. In a drying plant the combination of means for delivering thereto material to be dried, means for drawing heated gases laterally therethrough, a vertical drying chamber having secured therein spaced plates providing diametrically opposite openings, a vertical drive shaft mounted in said chamber and having secured thereto for rotation therewith plates having diametrically opposite openings therein, said plates being adapted to rotate between said fixed plates, means for removing step by step from said plates the drying material, and means for removing the dried material from the plant.

3. In a drying plant the combination of means for delivering thereto material to be dried, means for drawing heated gases laterally through the material, a vertical drying chamber having foraminous walls and spaced segmental plates therein provided with diametrically opposite segmental openings, arresting fingers secured to the under sides of said segmental plates, a vertical drive shaft having mounted thereon for rotation therewith spaced plates provided with diametrically opposite segmental openings, said plates adapted to rotate between said fixed plates, and being provided with advancing fingers on their under sides.

4. In a dryer the combination of a vertical drying chamber having a surrounding preheating chamber, an inner heating chamber having end walls extending to the walls of the pre-heating chamber and foraminous side walls, a heat generating chamber, a duct connecting said heating and heat generating chambers, means for causing the passage of air through all said chambers, a conveyor mounted in said inner heating chamber comprising a vertical series of elongated horizontally mounted rotary quadrants, each provided with driving means at one end, a vertically disposed drive shaft, said shaft having driving means engaging said quadrant driving means, and means for delivering material to be dried to the uppermost of said quadrants.

5. In a dryer the combination of a vertical drying chamber having a surrounding preheating chamber, an inner heating chamber, diametrically opposite baffle plates extending inwardly from the walls of said drying chamber, a foraminous conveyor chamber secured to said baffle plates, a conveyor shaft axially mounted in said conveyor chamber, spaced, horizontally disposed plates fixed to the walls of the conveyor chamber and provided with openings whose combined area is approximately one-half the area of a cross-section of said conveyor chamber, horizontal plates mounted on said shaft between said fixed plates, and having openings of approximately the same area as the fixed plate openings, and means on said plates for positively and intermittently advancing material through said conveyor chamber.

6. In combination in a drying plant, a vertical drying tower comprising a pre-heating chamber formed by outer and inner walls, spaced apart by diametrically opposite baffle plates, said inner wall constituting the outer wall of a heating chamber, a foraminous conveyor casing mounted centrally of said heating chamber and spaced therefrom by diametrically opposite baffle plates, a conveyor shaft centrally mounted in said conveyor chamber, spaced, horizontally disposed plates provided with openings, fixed to the walls of the conveyor chamber, horizontal plates provided with openings, mounted on said shaft and disposed between said fixed plates, and means on said plates for positively and intermittently advancing material through said conveyor chamber.

7. In combination in a drying plant, a vertical drying tower comprising a pre-heating chamber formed by outer and inner walls spaced by baffle plates, said inner wall constituting the outer wall of a heating chamber, a foraminous casing spaced from the walls of said heating chamber by baffle plates, spaced segmental plates mounted within said casing, a conveyor shaft axially mounted within said casing and having segmental plates mounted thereon and disposed between said aforesaid segmental plates, arresting fingers located on the underside of said segmental plates, a remote heater connected with said pre-heating chamber, means for causing heated air to pass through said chamber and laterally through said foraminous casing, and means for driving said conveyor shaft.

8. In combination in a drying plant, a vertical drying tower comprising a pre-heating chamber formed by outer and inner walls spaced by baffle plates, said inner wall constituting the outer wall of a heating chamber, a foraminous casing spaced from the walls of said heating chamber by baffle plates, spaced segmental plates mounted within said casing, a conveyor shaft axially mounted within said casing and having segmental plates mounted thereon and disposed between said aforesaid segmental plates, arresting fingers located on the underside of said segmental plates, a remote heater connected with said pre-heating chamber, means for causing heated air to pass through said chamber and laterally through said foraminous casing, means for controlling the temperature of the air delivered to said heating chamber, and means for driving said conveyor shaft.

9. In a dryer the combination of a vertical drying chamber having a pre-heating chamber, an inner heating chamber having end walls extending through the walls of the pre-heating chamber and foraminous side walls spaced from the side walls of the pre-heating chamber, a heat generating chamber, a duct connecting said inner heating chamber and said heat generating chamber, means for causing the passage of air through all of said chambers, a conveyor mounted in said heating chamber comprising a vertical series of elongated horizontally mounted rotary quadrants, each provided with driving means at one end, a vertically disposed drive shaft, said shaft having driving means engaging said quadrant driving means, and means for delivering material to be dried to the uppermost of said quadrants.

10. In combination in a drying plant, a vertical drying tower comprising a pre-heating chamber formed by outer and inner walls spaced by diametrically opposite baffle plates, said inner wall of said pre-heating chamber constituting the walls of the heating chamber, a foraminous conveyor casing secured to the walls of said heating chamber by baffle plates, a conveyor shaft axially mounted in said conveyor chamber, spaced, horizontally disposed plates fixed to the walls of the conveyor chamber and provided with openings whose combined area is approximately one-half the area of a cross-section area of said conveyor chamber, horizontal plates mounted on said shaft between said fixed plates and having openings of approximately the same area as the fixed plate openings, and means on said plates for positively and intermittently advancing material through said conveyor chamber.

HULDREICH EGLI.
SAMUEL M. SHOEMAKER.